No. 760,110.  Patented May 17, 1904.

UNITED STATES PATENT OFFICE.

WILHELM EMMERICH, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ORANGE SULFUR DYE.

SPECIFICATION forming part of Letters Patent No. 760,110, dated May 17, 1904.

Application filed February 25, 1904. Serial No. 195,285. (No specimens.)

*To all whom it may concern:*

Be it known that I, WILHELM EMMERICH, Ph. D., chemist, a citizen of the Empire of Germany, residing at Höchst-on-the-Main, Germany, have invented new and useful Improvements in the Manufacture of an Orange-Colored Sulfurized Dyestuff, of which the following is a specification.

I have found that if the known toluylene diurea obtained by combining the hydrochlorid of metatoluylenediamin (1:2:4) with potassium cyanate be heated with sulfur a dyestuff is obtained which dyes cotton an orange color in a sulfur alkaline bath.

The process may be carried out, for instance, as follows: Into six kilos of fused sulfur are introduced at 170° to 180° centigrade two kilos of toluylene diurea in such a manner that the mass is kept in fusion. The temperature is then maintained at 220° to 230° centigrade for one hour, and the mass is further heated to 200° to 230° centigrade for fifteen hours.

The pulverized product of reaction is of a dark red-brown, insoluble in water, alcohol, and concentrated sulfuric acid, soluble with difficulty in cold caustic-soda lye or alkali-sulfid solution, and soluble with a brown color in hot concentrated caustic-soda lye or hot alkali sulfid. On evaporating the alkali-sulfid solution the dyestuff is obtained in a form soluble in water.

The dyeings obtained with the alkali-sulfid solution are of orange color fast to light and soap and do not change even when boiled with sodium carbonate or a solution of acids.

Having now described my invention, what I claim is—

As a new product the dyestuff obtained as herein described by heating toluylene diurea with sulfur, being a dark red-brown powder, soluble in hot caustic-soda lye and sodium-sulfid solution with a brown color; on evaporating the sodium-sulfid solution, the dyestuff is obtained in a form soluble in water, the solution dyeing cotton a bright and fast orange color.

In testimony that I claim the foregoing as my invention I have signed my name in presence of two subscribing witnesses.

WILHELM EMMERICH.

Witnesses:
 ALFRED BRISBOIS,
 JEAN GRUND.